United States Patent
Britz et al.

(10) Patent No.: US 11,815,072 B2
(45) Date of Patent: Nov. 14, 2023

(54) THERMAL ACTUATOR ARRANGEMENT HAVING IMPROVED RESET TIME

(71) Applicants: UNIVERSITY OF SAARLAND, Saarbrücken (DE); ZEMA, CENTER FOR MECHATRONICS AND AUTOMATION TECHNOLOGY, Saarbrücken (DE)

(72) Inventors: Rouven Britz, Saarbrücken (DE); Stefan Seelecke, Saarbrücken (DE); Paul Motzki, Saarbrücken (DE)

(73) Assignees: University of Saarland, Saarbrucken (DE); Zema Ctr for Mechatronics and Automation Tech., Saarbrucken (DE)

( * ) Notice: Subject to any disclaimer, the term of this patent is extended or adjusted under 35 U.S.C. 154(b) by 0 days.

(21) Appl. No.: 17/761,385

(22) PCT Filed: Sep. 15, 2020

(86) PCT No.: PCT/EP2020/075713
§ 371 (c)(1),
(2) Date: Mar. 17, 2022

(87) PCT Pub. No.: WO2021/052933
PCT Pub. Date: Mar. 25, 2021

(65) Prior Publication Data
US 2022/0290659 A1     Sep. 15, 2022

(30) Foreign Application Priority Data
Sep. 18, 2019     (DE) .................... 10 2019 125 143.5

(51) Int. Cl.
*F03G 7/06* (2006.01)
(52) U.S. Cl.
CPC .................... *F03G 7/06* (2013.01)

(58) Field of Classification Search
CPC ........................................ F03G 7/06
(Continued)

(56) References Cited

U.S. PATENT DOCUMENTS 5,955,817 A * 9/1999 Dhuler ................ F16K 99/0001
310/307
6,982,515 B2 * 1/2006 Howell ................ H01H 61/04
310/307
(Continued)

FOREIGN PATENT DOCUMENTS

DE     19963501 A1     6/2001
DE     102012208423 A1     11/2012
(Continued)

OTHER PUBLICATIONS

International Search Report dated Dec. 15, 2020, in international patent application No. PCT/EP2020/075713, 6 pages.

*Primary Examiner* — Hoang M Nguyen
(74) *Attorney, Agent, or Firm* — Blueshift IP; Robert Plotkin

(57) ABSTRACT

The invention relates to a thermal actuator arrangement for moving an actuator between a first actuating position and a second actuating position comprising: a first partial actuator having a first thermal actuator element to which a first opposing force is applied; a second partial actuator having a second thermal actuator element to which a second opposing force is applied, wherein the actuator elements are configured to modify their shape against the opposing force in each case as a result of a temperature change; an actuator which is coupled to the first partial actuator, such that, when the first actuator element is deactivated, the actuator is held in the first actuating position when a holding force takes effect and, when the holding force is eliminated, the actuator moves to the second actuating position due to the effect of the first opposing force; a securing element which is coupled (Continued)

to the second partial actuator in order to provide the holding force when the second actuator element is in the deactivated state and to reduce or eliminate the holding force in the activated state of the second actuator element.

15 Claims, 8 Drawing Sheets

(58) Field of Classification Search
USPC .............................. 60/527–529; 310/306–307
See application file for complete search history.

(56) References Cited

U.S. PATENT DOCUMENTS

| | | | |
|---|---|---|---|
| 8,707,694 B2 | 4/2014 | Olson | |
| 2015/0369381 A1* | 12/2015 | Rodegheri | ............... F16K 11/07 137/625.48 |
| 2016/0131275 A1* | 5/2016 | Rodegheri | ........... H10N 30/206 29/25.35 |
| 2021/0035748 A1* | 2/2021 | Balog | ..................... F03G 7/065 |

FOREIGN PATENT DOCUMENTS

| | | |
|---|---|---|
| DE | 102012104901 A1 | 12/2013 |
| DE | 102014113065 A1 | 3/2016 |
| DE | 112017004705 T5 | 6/2019 |
| EP | 1752661 A1 | 2/2007 |
| EP | 2937565 A1 | 10/2015 |
| WO | 2019106340 A1 | 6/2019 |

* cited by examiner

THERMAL ACTUATOR ARRANGEMENT HAVING IMPROVED RESET TIME

TECHNICAL FIELD

The invention relates to thermal actuator arrangements, in particular positioning actuators, which can be activated by a thermal actuator element.

TECHNICAL BACKGROUND

Actuators having thermal actuator elements are referred to as thermal actuator arrangements which can cause a positioning movement when subjected to heat. Thermal actuator arrangements can, for example, be configured with thermoelastic actuator elements that have a thermoelastic material (also referred to as elastocaloric or mechanocaloric material). Such thermoelastic materials change their microstructure when subjected to a temperature change. Due to this, thermoelastic elements can reduce their dimensions or exert a tensile force when heated. In the event of cooling, the thermoelastic element resumes its original shape, particularly if an appropriate restoring force is present. One group of common thermoelastic materials are shape memory alloys.

Thermal actuators are generally used for the actuation of an actuating element between two defined actuating positions, for example for controlling a valve. In certain applications, a resetting of positioning actuators is time-critical. For example, in the case of a valve actuator, the valve must close very quickly in the event of an emergency shutdown. The use of a thermal actuator that can be actuated by heating thermoelastic material is out of the question for implementing the emergency shutdown function, since resetting by cooling the thermoelastic material usually takes too long. Other mechanisms for rapidly resetting the actuator are costly and have high installation space requirements.

In addition, antagonistic thermal actuators are known in which a repositioning movement is effected by another thermoelastic element.

For example, document DE 199 63 501 A1 discloses an actuator for an actuating element that can be actuated between a home position and an actuating position. The actuator has shape memory elements acting against each other, of which a first shape memory element is effective in the direction of an actuating position when a certain temperature is exceeded, and wherein the second shape memory element is correspondingly effective in the opposite direction.

U.S. Pat. No. 8,707,694 B2 discloses an actuator comprising a first shape memory element that can exert a force on an actuator element of the actuator, and comprising a further shape memory element that exerts an opposing force on the actuator element. The actuator element is used to operate a valve, which can be actuated or deactivated by selectively controlling the first and second shape memory elements.

Further, document WO 2019/106340 discloses a thermoelastic actuator comprising a thermoelastic wire and an actuator element, wherein the thermoelastic wire is arranged between a static part and the actuator element in order to cause a movement of the actuator element with respect to the fixed part by contraction. Further, a return element is provided which is connected to the actuator element in order to reset the actuator element.

In conventional antagonistic thermoelastic actuator arrangements, a rapid resetting of the actuator element is also not readily possible because the rate of resetting depends directly on the material properties of the actuated thermoelastic element and its cooling rate. In addition, stretching of the thermoelastic element in the actuated state causes degradation of the thermoelastic material, such that resetting by applying a corresponding resetting force to an actuated (contracted) element results in a reduction of life cycle.

In addition, known antagonistic thermoelastic actuator arrangements do not have a defined reset position, which can lead to an undefined position of the actuator arrangement when de-energized.

Thus, it is an object of the present invention to provide a thermal actuator arrangement that has an improved reset time and a defined position when de-energized.

DISCLOSURE OF THE INVENTION

This object is achieved by the thermal actuator arrangement according to claim 1.

Further embodiments are specified in the dependent claims.

According to a first aspect, a thermal actuator arrangement for moving an actuator between a first actuating position and a second actuating position is provided, comprising:
- a first partial actuator having a first thermal actuator element, to which a first opposing force is applied;
- a second partial actuator having a second thermal actuator element to which a second opposing force is applied, wherein the actuator elements are configured to modify their shape against the opposing force in each case due to the effect of a temperature change;
- an actuator, which is coupled to the first partial actuator, such that, when the first actuator element is deactivated, the actuator is held in the first actuating position when a holding force takes effect and, when the holding force is eliminated, the actuator moves to the second actuating position due to the effect of the first opposing force;
- a securing element, which is coupled to the second partial actuator in order to provide the holding force when the second actuator element is in the deactivated state and to reduce or eliminate the holding force when the second actuator element is in the activated state.

The above thermal actuator arrangement includes a first partial actuator and a second partial actuator. The partial actuators are each formed with a thermal actuator element and a spring element that act against each other. The thermal actuator elements are deformable by applying heat and can thereby be activated, and resume their original shapes by the action of the corresponding opposing force of the respective partial actuator upon cooling down when they are deactivated.

The thermal actuator arrangement has a movable actuating element that is movable between a first actuating position and a second actuating position. The first partial actuator is configured in such a way to hold the actuating element in the non-activated/deactivated state in the first actuating position when a holding force is applied, and to move the actuating element to the second actuating position when the holding force decreases by deforming the first thermal actuator element in the non-activated state by the opposing force.

The second partial actuator serves to exert the holding force on the first partial actuator in the non-activated state and, when the thermal actuator element of the second partial actuator is being activated, to reduce or remove the holding force. By de-actuating the thermal actuator element, the holding force can be applied to the first partial actuator again.

Thus, the thermal actuator elements can be operated such that by heating the second thermal actuator element, the holding force is taken away such that the positioning actor moves from the first actuating position to the second actuating position. Subsequent actuation of the first thermoelastic actuator element moves the positioning actor from the second actuating position back to the first actuating position.

The thermal actuator elements generally have a fast response time upon actuation, but take longer to reset due to the time required for the corresponding thermal actuator element to cool down by convection. Therefore, by the above arrangement it can be achieved that an actuation of the actuating positions from the first to the second actuating position and from the second to the first actuating position is independent of the cooling time duration of the actuator elements, since both positioning movements are achieved by actuating one of the actuator elements.

By providing at least one end stop for the first actuating position for the movement of the actuating element, a defined reset position for the deactivated state at the first actuating position can be ensured when both thermal actuator elements are in the deactivated state by providing an opposing force or a spring force for the opposing force application of the second spring element of the second partial actuator, which is higher than the first opposing force or first spring force.

Due to the low installation space requirement of thermal actuator elements as well as of corresponding spring elements, actuator arrangements with low installation space requirements can be constructed in this way. By arranging the thermal actuator elements and the spring elements longitudinally, translational actuators in particular can be realized in an elongated design with small diameters.

Furthermore, the thermal actuator elements can be configured such that they change their shape when heated, and return to their original shape when cooled, in particular by the action of the respective opposing force, wherein the actuator elements comprise a thermoelastic material, in particular a shape memory alloy, a shape memory polymer or a bimetal.

According to an embodiment, the actuating element can be movably mounted, and can have a defined first actuating position and/or a defined second actuating position, which are defined by stop devices.

In particular, the first actuating position can be defined by a first stop device between the securing element and the actuator element in conjunction with a stationary stop of a second stop device of the securing element, and the second actuating position can be defined by a stationary stop of a third stop device.

Furthermore, the first opposing force can be configured to be smaller than the second opposing force, wherein in particular a first spring element for providing a first spring force as a first opposing force has a smaller spring constant than a second spring element for providing a second spring force F2 as a second opposing force.

It can be provided that the first opposing force in the deactivated state of the first actuator element deforms the actuator element plastically, quasi-plastically, and/or elastically such that the actuating element reaches the second actuating position.

Furthermore, the actuating element can be translationally movably mounted, wherein the securing element is movable between a first securing position and a second securing position parallel to the actuating element.

It can be provided that at least the actuating element is rotationally movably mounted, wherein in particular the securing element is rotationally mounted, and is movable between a first securing position and a second securing position coaxially to the actuating element.

In particular, the first actuator element can be at least partially deflected by a circumference of the rotor element, and/or the second actuator element can be at least partially deflected by a circumference of the securing element.

Further, the respective opposing force can be provided by at least one of the following elements: a compression spring, a tension spring, a torsion spring, and a bending spring.

It can be provided that at least one of the actuator elements is configured to be elongated, and, in particular, to be wire-shaped or rod-shaped.

According to an embodiment, at least one of the actuator elements can be coupled to an energy supply in order to heat the respective actuator element by supplying electrical power.

According to a further embodiment, a bistable element can be provided that is coupled to the actuating element such that, upon actuation of the actuator element, the bistable element changes from one bistable state to another bistable state.

According to a further aspect, a method of operating the above thermal actuator arrangement is provided, comprising the following steps:

Actuating the second actuator element to move the actuator element from the first actuating position to the second actuating position, actuating the first actuator element to move the actuator element from the second actuating position to the first actuating position.

BRIEF DESCRIPTION OF THE DRAWINGS

Embodiments are explained in more detail below with reference to the accompanying drawings, wherein.

DESCRIPTION OF EMBODIMENTS

Figure 1:
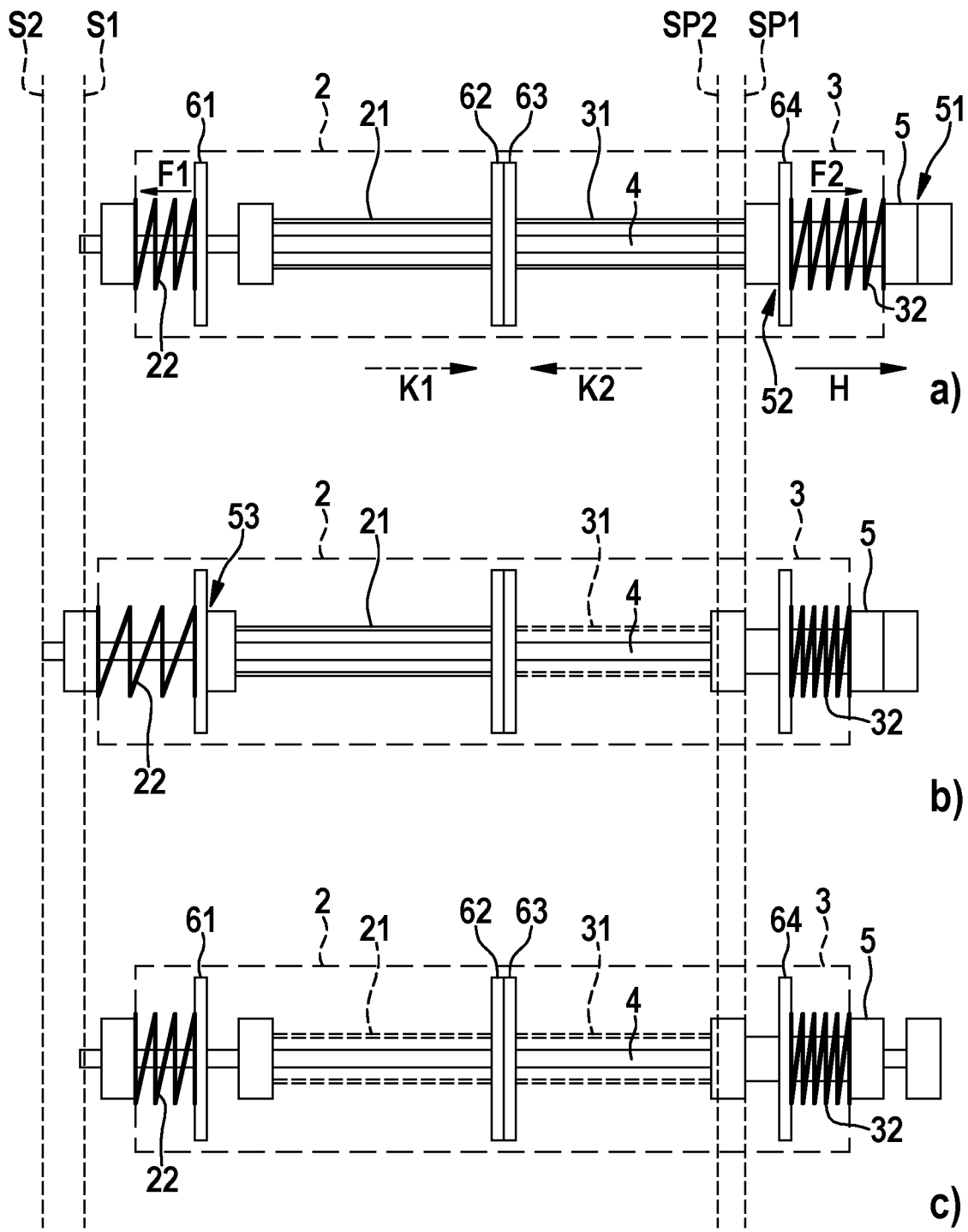
FIGS. 1a to 1c illustrate a thermal actuator arrangement according to a first embodiment in various switching states.

FIGS. 1a to 1c illustrate different states of a translational thermal actuator arrangement 1 according to a first embodiment. In FIG. 1a, the thermal actuator arrangement 1 is illustrated in a rest position.

The thermal actuator arrangement 1 has a first partial actuator 2 and a second partial actuator 3. The first partial actuator 2 acts on an actuating element 4, which is held so as to be translationally displaceable, and is coupled to the first and second partial actuators 2, 3, respectively. The actuating element 4 is adjustable between a first actuating position S1 and a second actuating position S2. A force direction acting in the direction of the first actuating position S1 is referred to as a first force direction K1, and a force direction acting in the direction of the second actuating position S2 is referred to as a second force direction K2.

The first partial actuator 2 has a first thermal actuator element 21, and the second partial actuator 3 has a second thermal actuator element 31. The actuator elements 21, 31 are configured such that they change their shape when heated, and return to their original shape when cooled. In particular, the described embodiment utilizes a contraction of the actuator elements 21, 31 when they are heated and a quasi-plastic expansion when they are cooled and upon action of an opposing force.

The first and/or second thermal actuator element 21, 31 can, for example, be formed with a thermoelastic material, such as a shape memory alloy, such as a thermoelastic wire, a thermoelastic spring, or any other thermoelastic element. Other thermal actuator elements can comprise, for example, shape memory polymers, bimetals, or other strain elements as active materials.

The first partial actuator 2 has the first thermal actuator element 21, which in a deactivated state holds the actuating element 4 in the first actuating position S1 against a first spring force F1 (opposing force), and when a predetermined holding force H acts in the first force direction K1. The deactivated state of the actuator element is, for example, at ambient temperature. The activated state is assumed at a temperature of the actuator element that is heated above this. In the embodiment shown, the first spring force F1 can be provided by a first spring element 22, which is configured as a compression spring. For this purpose, the first actuator element 21 can be arranged and can be effective between a second stationary holding element 62 and the actuating element 4.

The first spring element 22, which can be configured as a compression spring, is supported at one end on a first stationary holding element, and exerts the first spring force F1 in the second force direction K2 on the actuating element 4, such that the first thermal actuator element 21 is loaded in tension. The first thermal actuator element 21 and the first spring element 22 are configured such that the actuating element 4 cannot be held in the first actuating position S1 without the action of the further holding force. That is, the tensile force exerted by the first spring element 22 on the first actuator element 21 is not sufficient to stretch the first actuator element 21 to such an extent that the actuating element 4 is moved out of the first actuating position S1 as long as the additional holding force H is acting.

The holding force H in the first force direction K1 is provided by the second partial actuator 3. The second partial actuator 3 is formed with a second thermal actuator element 31 and a second spring element 32. The second spring element 32 and the second thermal actuator element 31 act on a securing element 5. The securing element 5 is displaceably arranged on the actuating element 4 and can be actuated by the second actuator element 31 between a first securing position SP1 and a second securing position SP2. A stop device 51 is provided between the actuating element 4 and the securing element 5, which in a first securing position SP1 exerts the holding force H on the first partial actuator 2 by means of the actuating element 4, and thus holds the actuating element 4 at the first actuating position S1. In particular, the holding force H is exerted in the first force direction K1 against the first spring force F1 of the first spring element 22. The spring constant of the second spring element 32 is correspondingly dimensioned such that it can also exert the holding force H against the first spring force F1 of the first spring element 22.

Stop devices within the meaning of the present invention are formed by two elements which are movable relative to one another, thereby forming a stationary or movable stop when moving relative to one another.

The second spring element 32 acts on the second actuator element 31 such that the second actuator element 31 is subjected to a tensile stress. The second actuator element 31 is arranged between a third stationary holding element 63 and the securing element 5. The second spring element 32 is arranged between a fourth stationary holding element 64 and the securing element 5. In the exemplary embodiment shown, the second spring element 32 is configured as a compression spring and presses the securing element 5 against the first stop device 51 in the first force direction K1, such that—in the deactivated state of the second actuator element 31—the securing element 5 is held at the predetermined first securing position SP1.

By means of a stationary second stop device 52, which can be provided for example on the fourth stationary holding element 64, the first securing position SP1 and thus also the first actuating position S1 of the actuating element 4 can be determined. The second stop device 52 between the securing element 5 and a fourth stationary holding element 64 causes, when the securing element 5 moves in the first force direction K1, that the movement of the actuating element 4 is blocked at the first securing position SP1 and that the actuating element 4 is held there, thereby defining the first actuating position S1 due to the first stop device 51 between the actuating element 4 and the securing element 5. The securing element 5 and the actuating element 4 are thus coupled to each other such that a movement of the securing element 5 in the first force direction K1 is limited by the second stop device 52, and a movement of the actuating element 4 in the second force direction K2 is limited by the first stop device 51.

In the actuator arrangement 1 shown in FIG. 1a, the actuating element 4 is thus held in the first actuating position S1 by the securing element 5 when both actuator elements 21, 31 are deactivated. If the second actuator element 31 is now actuated, as shown in connection with FIG. 1b, the extension of the second actuator element 31 is reduced and a tensile force is exerted on the securing element 5 in the second force direction K2.

Actuation of the actuator elements 21, 31 can be achieved by applying electrical energy. For this purpose, for example, opposite ends of the wire-shaped or elongated actuator elements 21, 31 can be provided with contacts in order to switchably heat the actuator elements with the aid of electrical energy.

Exertion of the tensile force on the securing element 5 in the second force direction K2 leads to reduction or elimination of the holding force H, and, due to the effect of the first spring force F1 of the first spring element 22, to the fact that the actuating element 4 moves with the securing element 5 in the second force direction K2, and thus the actuating element 4 moves to the second actuating position S2. The second actuating position can be fixed by a third stop device 53 between the actuating element 4 and a suitable holding element, in particular the first holding element 61. Alternatively, the second actuating position S2 can also be determined by the first stop device 51 when the securing element 5 is in the second securing position.

Alternatively, the second actuating position S2 can be defined by the length or extension of the second actuator element 31 in the activated state, which defines the second securing position SP2 by means of the displacement of the securing element 5 in the second force direction K2.

By actuating the second actuator element 31, the holding force H caused by the second spring element 32 is reduced or completely eliminated, and the first spring element 22 can exert the full first spring force F1 on the first actuator element 21, whereby the first actuator element 21 is stretched and moves the actuating element 4 in the direction of the second actuating position. Therefore, a dimensioning is provided between the spring constant of the first spring element 22 and the elasticity of the first actuator element 21, which allows the first actuator element 21 to be stretched from the first actuating position (essentially unloaded state of the first actuator element) to the second actuating position S2 by the first spring force F1 of the first spring element 22.

A reset from the second actuating position S2 to the first actuating position S1 is possible thereafter by simply de-actuating the second actuator element 31, but for the reset it usually takes an indefinite longer period of time, since the second actuator element 31 must cool down for this purpose in order to cause the corresponding change in shape, in particular in conjunction with the acting second opposing force. The cooling rate in this case is determined only by the heat dissipation into the environment, provided that no separate cooling measures are provided. Cooling is generally slower than heating, since the power input for heating, for example by electrical energy, is essentially limited only by the amount of power provided.

However, in order to move the actuating element 4 of the thermal actuator arrangement 1 more quickly from the second actuating position S2 to the first actuating position S1, an actuation of the first thermal actuator element 21 is provided while the second actuator element 31 is simultaneously activated. FIG. 1c shows the state which is achieved in this way. This has the effect that the actuating element 4 is actively moved back into the first actuating position S1 against the first spring force F1 of the first spring element 22, without the holding force H necessarily acting on the actuating element 4 in the first force direction K1 for this and without an additional force being exerted on the second actuator element 31. This prevents deformation of the actuator elements in the activated state.

Since actuating an actuator element by heating leads to a corresponding deformation or change in length considerably faster, compared to the case when de-actuating by cooling and applying an opposing force, resetting from the second actuating position S2 to the first actuating position 51 can be performed considerably faster. By de-actuating the second actuator element 31 and subsequently de-actuating the first actuator element, the actuator arrangement 1 can be returned from the state shown in FIG. 1c to the starting position shown in FIG. 1a.

Alternatively, simultaneously with the actuation of the first actuator element 21, starting from the state shown in FIG. 1b, the second actuator element 31 can be deactivated to start the cooling process already at the beginning of the reset process. This makes it possible to reduce a dead time until the second partial actuator 3, the state of which is shown in FIG. 1a, is ready to be actuated again.

In the deactivated state of both actuator elements 21, 31, a design of the spring elements 22, 32 with different spring forces can result in a predetermined actuating position, in particular the first actuating position, which is reached when the actuator arrangement 1 is in the deactivated, i.e. unpowered, state. In particular, the second spring force F2 of the second spring element 32 is selected to be higher than the spring force of the first spring element 22 at this operating point when the actuator arrangement 1 is in a position corresponding to the first actuating position S1, such that when both actuator elements 21, 31 are in the deactivated state, the securing element 5 is moved into the first securing position SP1, and, due to the first and second stop devices 51, 52, the actuating element 4 is correspondingly moved into the first actuating position S1.

By adjusting the length of the actuating element 4 in the region of the first stop device 51 and/or by adjusting the second stop device 52, adjustability of the actuating positions S1, S2 can be achieved.

The actuator arrangement 1 described above can be used as an actuator for a plurality of positioning actors, which in particular are intended to enable an actuation between two defined actuating positions. For example, the actuator arrangement can be used as valve actuators, locking actuators, unlocking actuators, positioning actuators, brake actuators, (contact) switches and the like.

Figure 2:
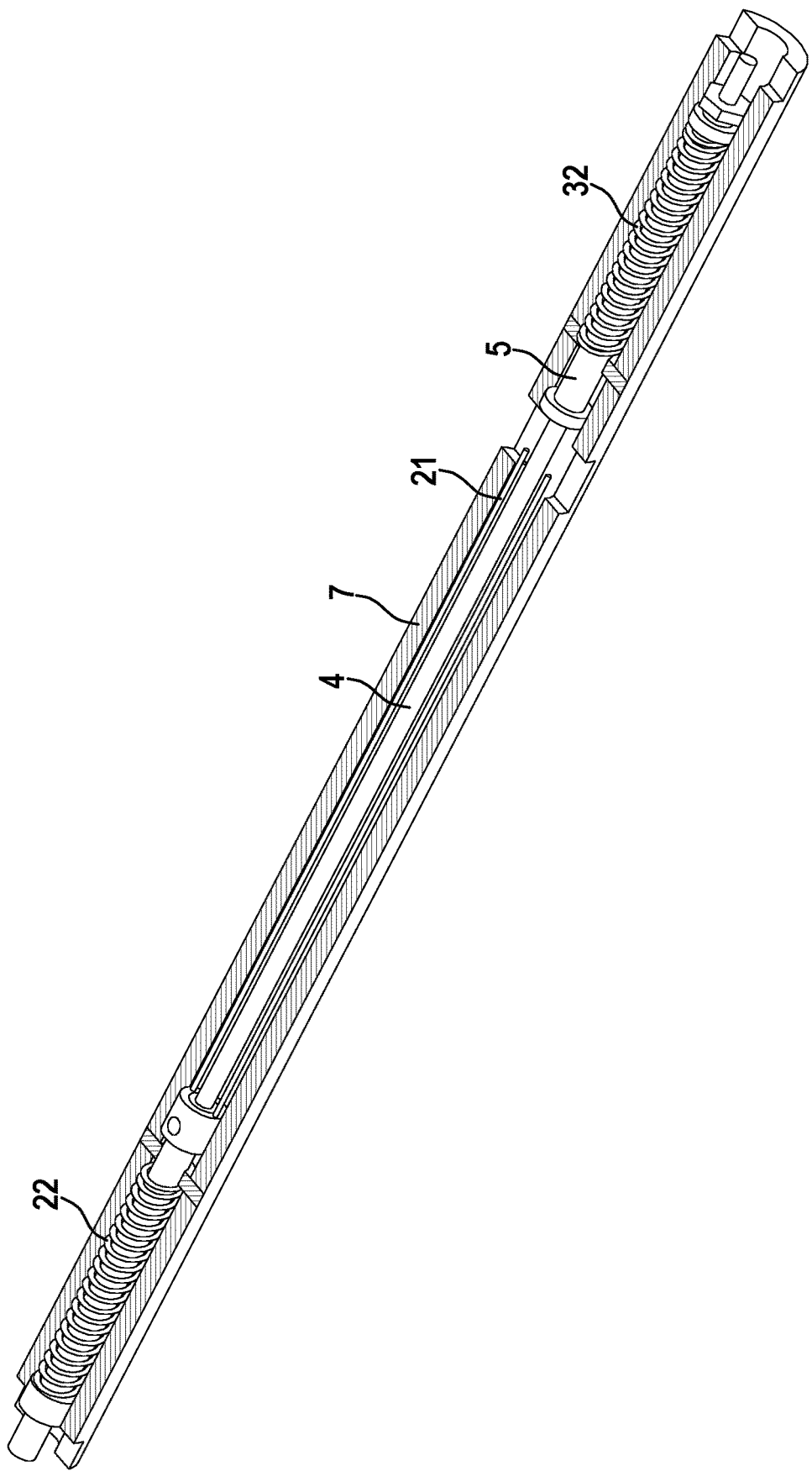
FIG. 2 illustrates an implementation of the thermal actuator arrangement of FIGS. 1a to 1c as a valve actuator.

The translational thermal actuator arrangement shown in FIGS. 1a to 1c can be used, for example, in a valve actuator as is shown in a sectional view in FIG. 2 as an example.

The arrangement of FIG. 2 shows an actuator housing 7 which is substantially tubular in shape. The actuator arrangement 1 is arranged in the actuator housing 7, and the actuator arrangement 1 is described, for example, in connection with FIGS. 1a-1c. Due to the elongated arrangement of the spring elements and the actuator elements, an implementation in a rod-like arrangement with a small diameter can be realized. The arrangement has the advantage that spring elements and actuator elements can be arranged adjacent to each other in the longitudinal direction, such that the elongated arrangement can be constructed with particularly small diameters. In addition, the first and second actuator elements can be arranged offset from one another with respect to the circumferential direction, in particular offset by 90°, such that they are arranged together in a section of the actuator arrangement.

The positioning movement of such an actuator arrangement is effected by the actuating element 4, which is arranged in the actuator housing 7, by means of a positioning movement which can be tapped at one end of the rod-shaped actuator arrangement, such that a corresponding actuating system, such as a valve or the like, can be set there.

Figure 3:
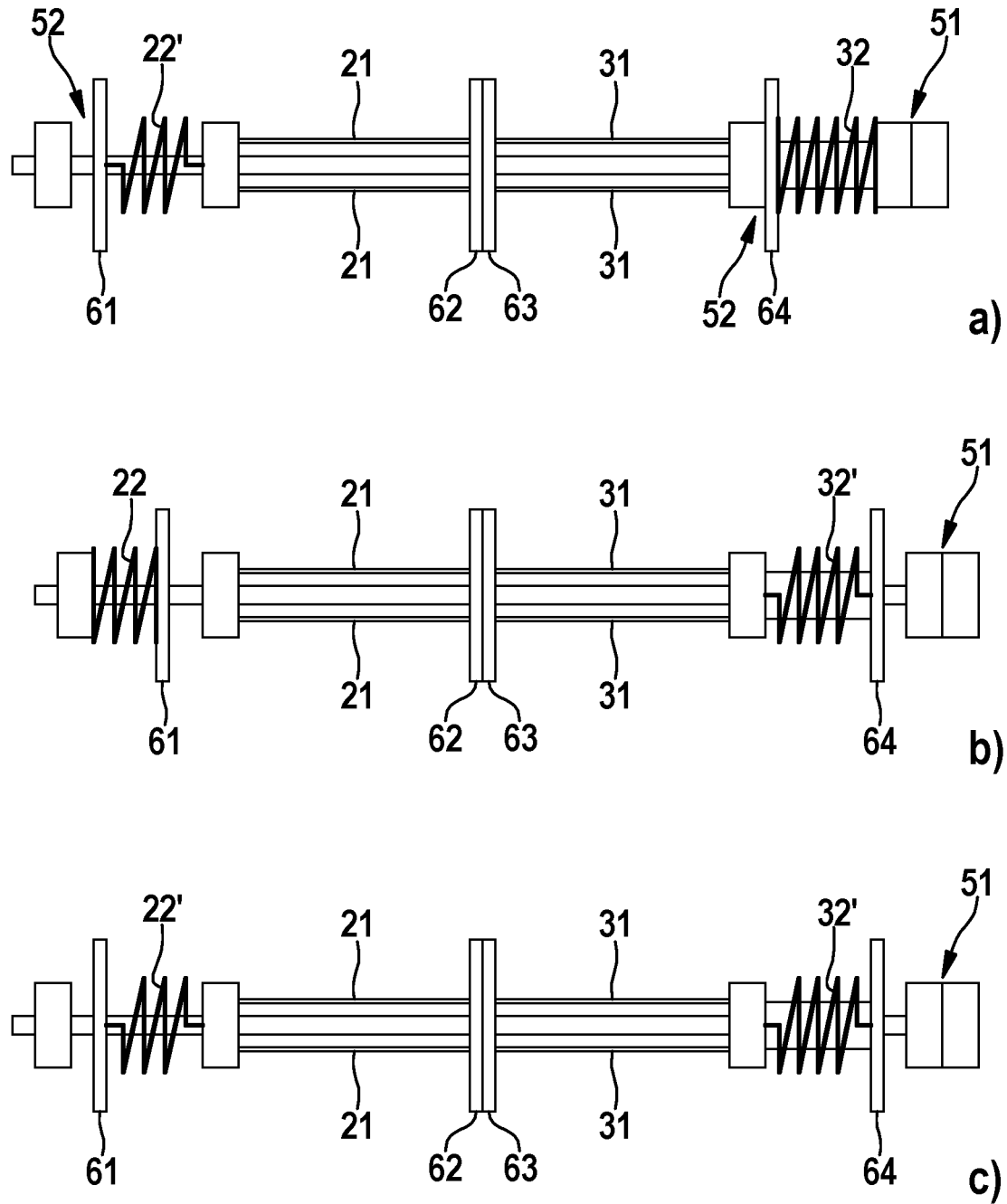
FIGS. 3a to 3c illustrate further embodiments of a translational thermal actuator arrangement using tension springs.

FIGS. 3a to 3c show translational actuator arrangements as further embodiments, in which a tension spring 22' (FIG. 3a) is provided instead of the compression spring as the first spring element 22, a tension spring 32' (FIG. 3b) is provided instead of the second spring element 32, or tension springs 22', 32' (FIG. 3c) are provided instead of both spring elements 22, 32. Overall, for the translational arrangement, the partial actuators 2, 3 are configured such that a respective spring force acts in the direction of an extension of the first and second thermal actuator element 21, 31, or a spring force acts against a direction of a change in shape of the actuator element 21, 31 when subjected to thermal action.

Figure 4:
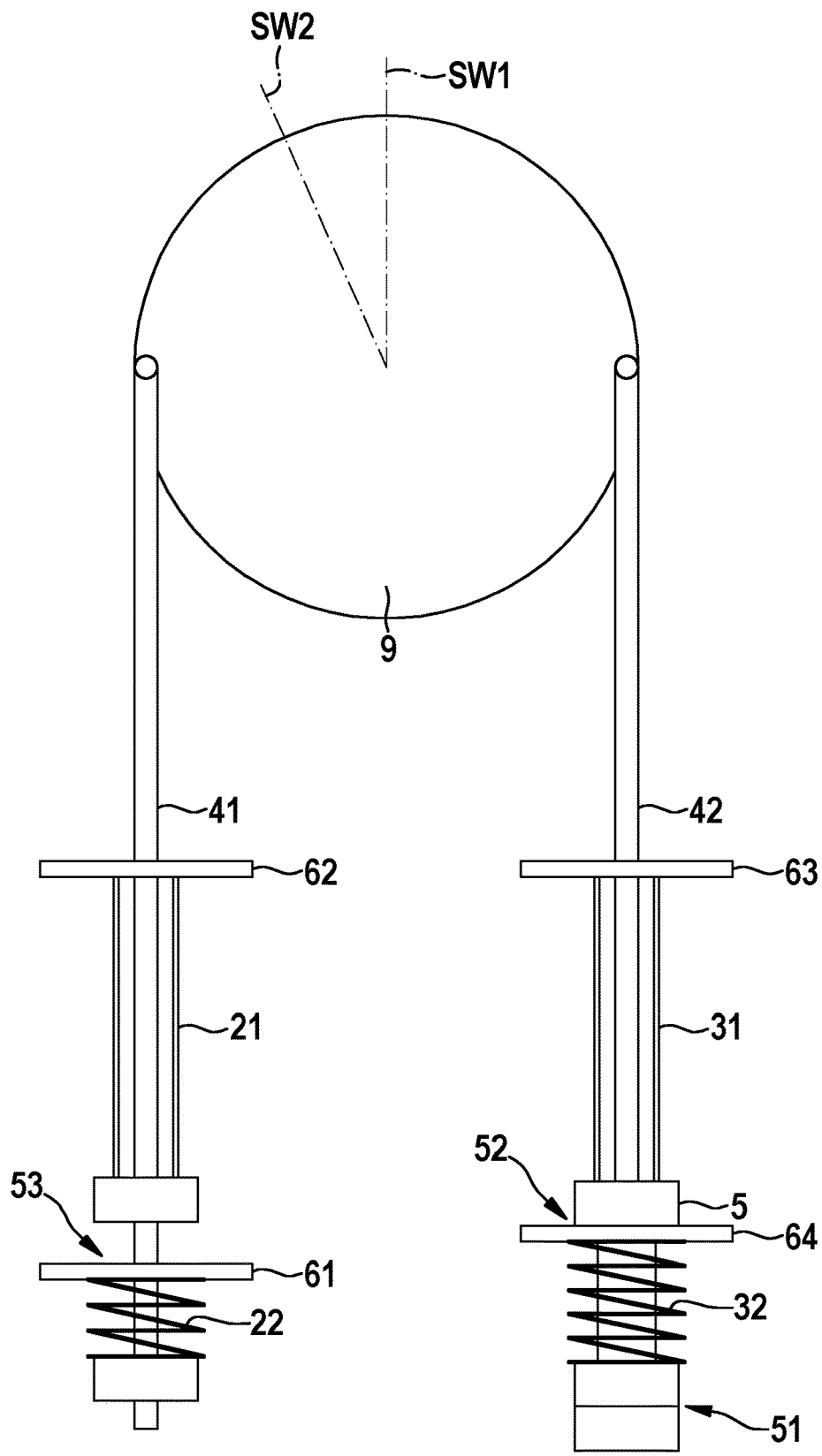
FIG. 4 illustrates an illustration of a rotational thermal actuator arrangement according to a further embodiment.

The embodiment shown in FIG. 4 illustrates the application of the actuator principle of FIGS. 1a-1c to a rotational actuator arrangement. In this case, the rigid actuating element 4 is divided into actuating element parts 41, 42, which are rotatably mounted on an actuating center part 9 at opposite attachment points. Depending on the position of the actuating element parts 41, 42, the actuating center part 9 assumes a first or second position angle SW1, SW2 as actuating positions. The basic principle corresponds to the basic principle of the arrangement shown in FIGS. 1a-1c, and is applicable since the transmission of force by means of the actuating center part 9 to the actuating element parts 41, 42 takes place in the same way as in the first embodiment. The first and second spring elements 22, 32 can be configured as compression and/or tension springs, as shown in FIGS. 3a to 3c, whereby the basic principle that the spring force/opposing force acts on the relevant thermal actuator element 21, 31 in the direction of extension in each case is maintained.

Figure 5:
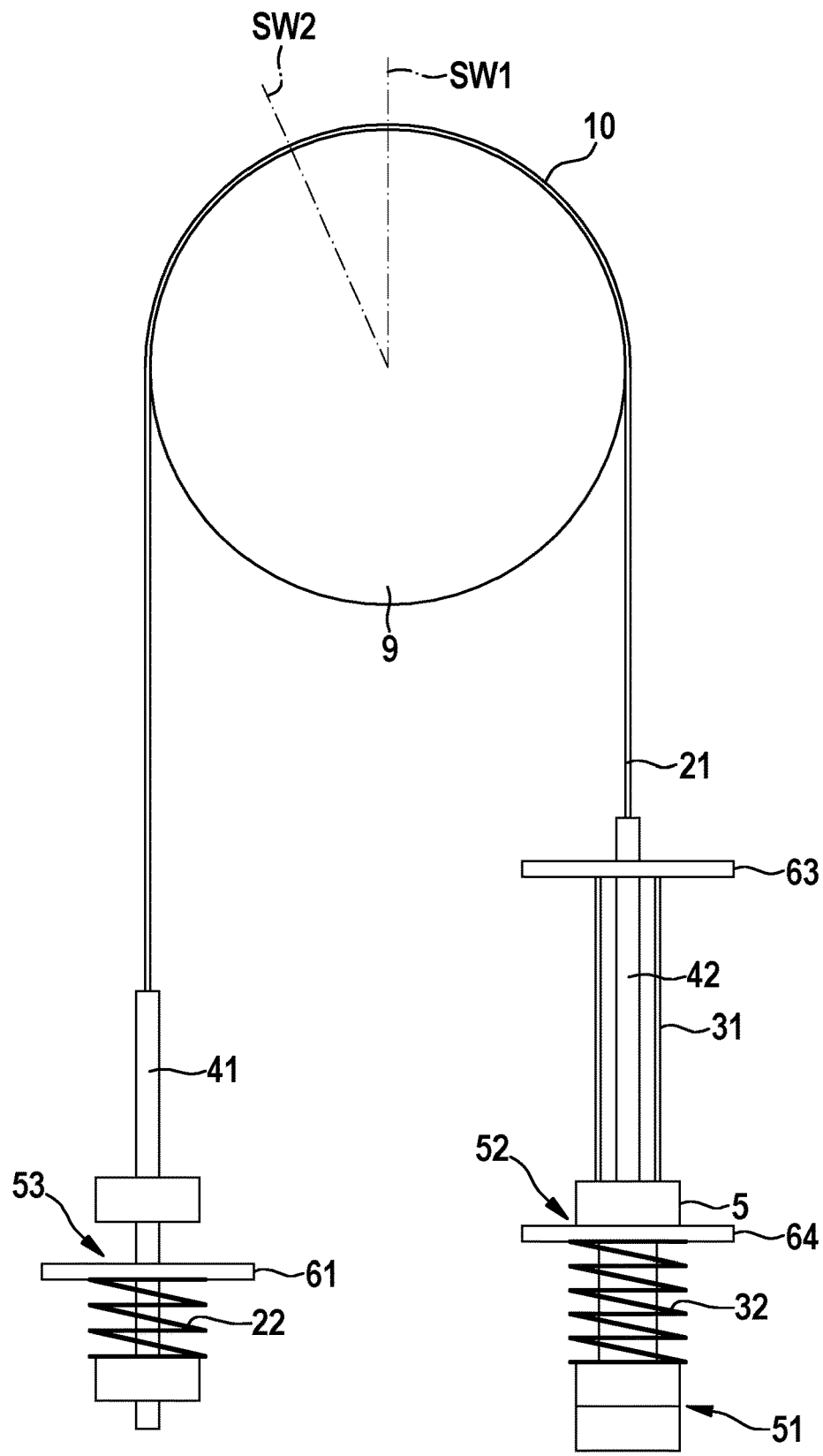
FIG. 5 illustrates an illustration of a rotational thermal actuator arrangement according to a further embodiment.

FIG. 5 shows the application of the actuator principle to a further rotational actuator arrangement in which the rigid actuating element 4 is replaced by a cable 10 which connects the actuating element parts 41, 42 to one another, and which is guided over a circumferential surface of the rotatably mounted actuating center part 9. The cable 10 is guided by the first actuating element part 41 over the actuating center part 9. The first actuator element 21 is arranged between one end of the cable 10 and the second actuating element part 42. The operating principle thus corresponds to the operating principle of the translational actuator arrangement.

Figure 6:
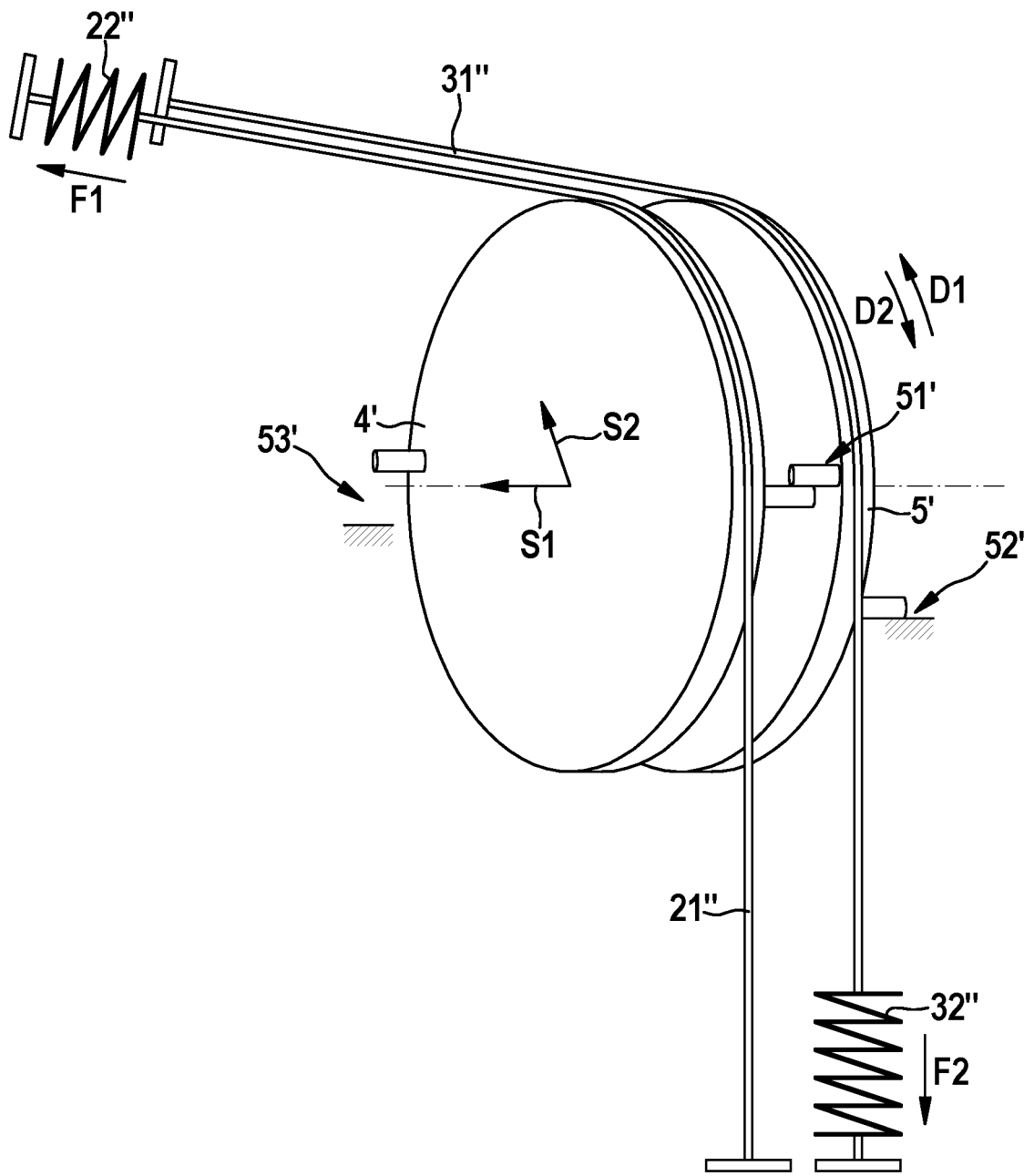
FIG. 6 illustrates a perspective illustration of a rotational thermal actuator arrangement according to a further embodiment.

The embodiment shown in FIG. 6 illustrates an embodiment in which the actuating element 4' and the securing element 5' are configured as coaxially movable rotary disc elements 4',5'. Accordingly, the first, second and third stop devices 51', 52', 53' are arranged on the disc-shaped actuating element 4' and the disc-shaped securing element 5' such that they define predetermined actuating positions S1, S2 and securing positions SP1, SP2, respectively, in a manner comparable to the embodiment described with respect to FIGS. 1a to 1c.

The actuator elements 21", 31", which can be wire-shaped in particular, then act to exert a torque on the actuating element 4' or the securing element 5'. The actuator elements 21", 31" can then also run partially along a circumferential surface of the respective disc element and entrain or rotate the disc element during contraction or expansion. The respective opposing force can be effected by a corresponding tension spring at one end of the respective actuator element 21", 31", or as a torsion spring arranged in the disc elements. Instead of a spring, the opposing force for the respective actuator element can also be achieved by a mass acted upon by gravity.

In particular, the actuating element 4' and the securing element 5' are coupled by means of the first stop device 51' when they rotate against each other such that the securing element 5' holds the actuating element 4' in the first actuating position S1 when both actuator elements 21", 31" are deactivated, and when the securing element 5' releases the rotation of the actuating element 4' when the second actuator element 31" is activated, such that the actuating element 4' moves to the second actuating position S2 against the first spring force F1 of the first spring element 22". When the second actuator element 31" is activated, the securing element 5' is moved in a first direction of rotation D1, such that the securing element 5' also drives the actuating element 4' in the first direction of rotation D1 due to the elimination of the stop of the first stop device 51' by the action of the first spring force F1 of the first spring element 22".

The spring elements 22", 32" and the actuator elements 21", 31" can be configured as torsion spring elements or torsion actuator elements, and can be arranged in the securing element 5' or actuating element 4'.

Figure 7:
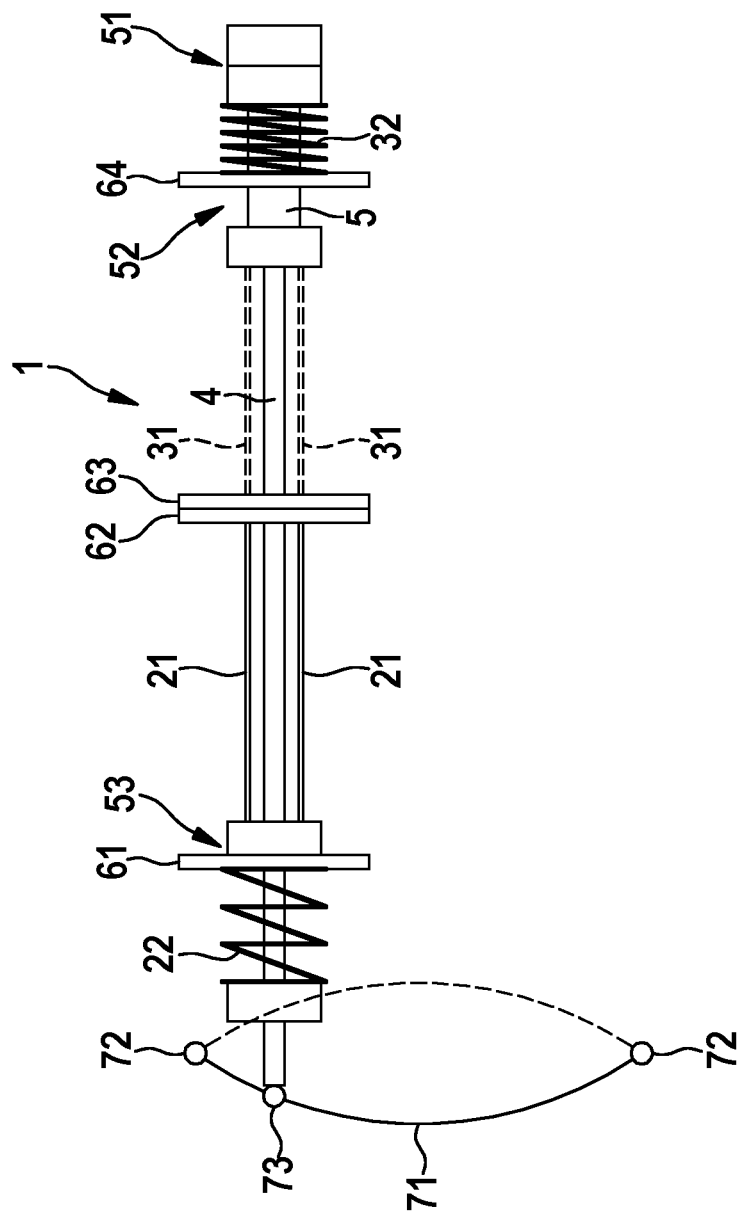
FIG. 7 illustrates an arrangement including the actuator arrangement and including a bistable element.

The embodiment shown in FIG. 7 illustrates the combination of the actuator arrangement shown in FIGS. 1a to 1c together with a bistable element 71. Bistable elements, also called snap-action elements or snap-action springs, can be actuated between two stable actuating states by applying an actuation force, in each state of which they remain until a corresponding actuation force is applied. The bistable element 71 shown in FIG. 7 can comprise an elastic metal leaflet which is firmly clamped between two holding positions 72 under a bending stress. The bistable element 71 is rotatably arranged at the holding position 72, such that the bistable element 71 can be actuated between two bistable positions. By coupling the actuator arrangement 1 at an application point 73, the bistable element 71 can be actuated without the reset time depending on a cooling rate. Furthermore, when resetting, there is also no need to apply a force against an activated state of one of the actuator elements, such that there is no elongation of the actuator element in the activated state.

The application point 73 is preferably provided close to a holding position 72, such that actuation of the bistable element is possible with a small displacement. By coupling with an external device in a center position M of the bistable element, an extension of the displacement can be achieved in a simple manner.

Figure 8:
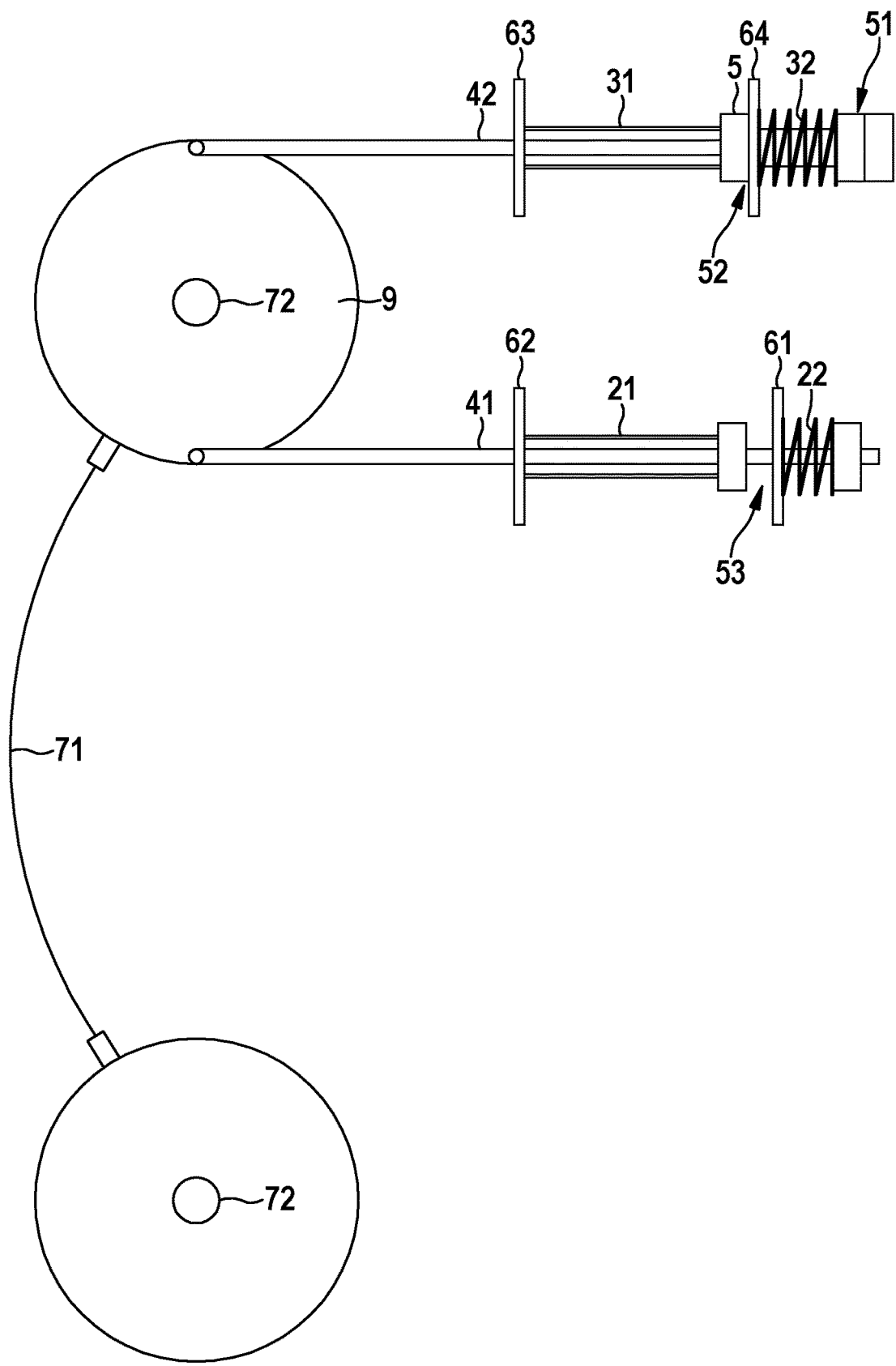
FIG. 8 illustrates a further arrangement including the actuator arrangement and including a bistable element.

FIG. 8 shows a further embodiment comprising a rotational actuator arrangement, as is shown in one of the embodiments of FIGS. 4, 5 and 6, and the bistable element 71 arranged to be rotatable between two holding positions 72. By exerting an actuating torque by means of one of the holding positions 72 on the bistable element 71 by means of the actuator arrangement 1, the bistable element 71 can be correspondingly actuated to one of the bistable positions.

The invention claimed is:

1. A thermal actuator arrangement for moving an actuator between a first actuating position and a second actuating position, comprising:
    a first partial actuator having a first thermal actuator element, to which a first opposing force is applied;
    a second partial actuator having a second thermal actuator element to which a second opposing force is applied, wherein the actuator elements are configured to modify their shape against the opposing force in each case due to the effect of a temperature change;
    the actuator, which is coupled to the first partial actuator, such that, when the first actuator element is deactivated, the actuator is held in the first actuating position when a holding force takes effect and, when the holding force is eliminated, the actuator moves to the second actuating position due to the effect of the first opposing force;
    a securing element, which is coupled to the second partial actuator in order to provide the holding force when the second actuator element is in the deactivated state and to reduce or eliminate the holding force when the second actuator element is in the activated state.

2. The thermal actuator arrangement according to claim 1, wherein the thermal actuator elements are configured such that they change their shape when heated and contract, and resume their original shape when cooled by the action of the corresponding opposing force, wherein the actuator elements comprise a thermoelastic material, the thermoelastic material comprising a shape memory alloy, a shape memory polymer or a bimetal.

3. The thermal actuator arrangement according to claim 1, wherein the actuator is movably mounted and comprises a defined first actuating position and/or a defined second actuating position, which are defined by corresponding stop devices.

4. The thermal actuator arrangement according to claim 3, wherein the first actuating position is defined by a first stop device between the securing element and the adjusting element in conjunction with a stationary stop of a second stop device of the securing element and/or the second actuating position is defined by a stationary stop of a third stop device.

5. The thermal actuator arrangement according to claim 4, wherein the first opposing force is configured to be smaller than the second opposing force, wherein a first spring element for providing a first spring force as first opposing force has a smaller spring force than a second spring element for providing a second spring force as second opposing force.

6. The thermal actuator arrangement according claim 1, wherein the first opposing force is configured such that it deforms the first actuator element in its deactivated state plastically, quasi-plastically and/or elastically such that the actuator moves to the second actuating position, wherein the actuator is moved into the second actuating position by the first opposing force.

7. The thermal actuator arrangement according to claim 1, wherein the actuator is mounted so as to be translationally movable, wherein the securing element is movable between a first securing position and a second securing position parallel to the actuator.

8. The thermal actuator arrangement according to claim 1, wherein at least a rotor part of the actuator is mounted rotationally movable, wherein the securing element is mounted rotationally, and is movable between a first securing position and a second securing position coaxially to the actuator.

9. The thermal actuator arrangement according to claim 8, wherein the first actuator element is at least partially deflected around a circumferential surface of the actuator, and/or wherein the second actuator element is at least partially deflected around a circumferential surface of the securing element.

10. The thermal actuator arrangement according to claim 1, wherein the respective opposing force is provided by at least one of the following elements: a compression spring, a tension spring, a torsion spring, a bending spring or a gravity-loaded mass element.

11. The thermal actuator arrangement according to claim 1, wherein at least one of the actuator elements is formed to be elongated and elastic, and is wire-shaped or rod-shaped.

12. The thermal actuator arrangement according to claim 1, wherein at least one of the actuator elements is coupled to an energy supply in order to heat the respective actuator element by supplying electrical power.

13. The thermal actuator arrangement according to claim 1, wherein a bistable element is provided that is coupled to the actuator such that when the actuator is actuated, the bistable element changes from one bistable state to a further bistable state, wherein the actuator is coupled to the bistable element in order to exert a translational or rotational actuation on the bistable element.

14. The thermal actuator arrangement according to claim 1, wherein the actuator is coupled to a valve actuator, a locking actuator, an unlocking actuator, a positioning actuator, a braking actuator, or a contact switch for actuation.

15. Method of operating the thermal actuator arrangement according to claim 1, comprising the following steps:
Actuating the second actuator element to move the actuator from the first actuating position to the second actuating position,
actuating the first actuator element to move the actuator from the second actuating position to the first actuating position.

* * * * *